(12) United States Patent
Shahsavari et al.

(10) Patent No.: US 10,931,352 B2
(45) Date of Patent: Feb. 23, 2021

(54) EFFICIENT BEAM SEARCH AND DATA COMMUNICATION IN MILLIMETER-WAVE WIRELESS NETWORKS

(71) Applicant: NEC Laboratories America, Inc., Princeton, NJ (US)

(72) Inventors: Shahram Shahsavari, Waterloo (CA); Mohammad Khojastepour, Lawrenceville, NJ (US)

(73) Assignee: NEC CORPORATION

( * ) Notice: Subject to any disclaimer, the term of this patent is extended or adjusted under 35 U.S.C. 154(b) by 0 days.

(21) Appl. No.: 16/591,070

(22) Filed: Oct. 2, 2019

(65) Prior Publication Data

US 2020/0119792 A1 Apr. 16, 2020

Related U.S. Application Data

(60) Provisional application No. 62/744,791, filed on Oct. 12, 2018.

(51) Int. Cl.
*H04B 7/06* (2006.01)

(52) U.S. Cl.
CPC ......... *H04B 7/0623* (2013.01); *H04B 7/0617* (2013.01)

(58) Field of Classification Search
CPC .. H04B 7/0619; H04B 7/0621; H04B 7/0623; H04B 7/0632
See application file for complete search history.

(56) References Cited

U.S. PATENT DOCUMENTS

| 9,629,171 | B2 | 4/2017 | Roy et al. |
| 9,958,525 | B2 | 5/2018 | Bartke |
| 2010/0164802 | A1 | 7/2010 | Li et al. |
| 2016/0021549 | A1 | 1/2016 | Subramanian et al. |
| 2016/0095003 | A1 | 3/2016 | Yu et al. |
| 2017/0195054 | A1 | 7/2017 | Ashrafi |
| 2019/0044588 | A1* | 2/2019 | Hong .................... H04L 5/0048 |
| 2020/0084820 | A1* | 3/2020 | Wiberg ................ H04B 7/0617 |

* cited by examiner

*Primary Examiner* — Kevin Kim
(74) *Attorney, Agent, or Firm* — Joseph Kolodka

(57) ABSTRACT

A method for establishing communication links in a millimeter wave network is presented. The method includes determining an active communication link between first and second devices, the first device transmitting probing packets to the second device, employing a beam search technique to locate narrow beams by triggering the first device to adjust its transmission pattern to cover a fraction of an angular uncertainty region (AUR) at a beginning of a time-slot, and adjusting transmission coefficients of the first device based on a response received from the second device such that if the second device receives a probing packet, the second device sends an acknowledgment packet to the first device and the first device updates the AUR such that the AUR is set to a probed angular interval, and if the second device does not receive the probing packet, the first device updates the AUR to a complementary part of the probed interval.

13 Claims, 6 Drawing Sheets

US 10,931,352 B2

EFFICIENT BEAM SEARCH AND DATA COMMUNICATION IN MILLIMETER-WAVE WIRELESS NETWORKS

RELATED APPLICATION INFORMATION

This application claims priority to Provisional Application No. 62/744,791, filed on Oct. 12, 2018, the contents of which are incorporated herein by reference in their entirety.

BACKGROUND

Technical Field

The present invention relates to millimeter-wave wireless networks and, more particularly, to efficient beam search and data communication in millimeter-wave wireless networks.

Description of the Related Art

Larger available bandwidths in millimeter-wave (mmWave) frequency bands (e.g., 30 GHz-300 GHz) can be employed to provide multi-Gbps data rates in a next generation of wireless networks. High pathloss and intense shadowing are among the major concerns in mmWave bands. Various beamforming (BF) techniques have been proposed to overcome these effects by forming directional and narrow transmissions beams patterns.

SUMMARY

A computer-implemented method for establishing communication links in a millimeter wave (mmWave) network is presented. The method includes determining an active communication link between a first device and a second device, wherein the first device transmits probing packets to the second device, employing a beam search technique to locate narrow beams by triggering the first device to adjust its transmission pattern to cover a fraction of an angular uncertainty region (AUR) at a beginning of a time-slot, and adjusting transmission coefficients of the first device based on a response received from the second device such that if the second device receives a probing packet, the second device sends an acknowledgment (ACK) packet to the first device and the first device updates the AUR such that the AUR is set to a probed angular interval, and if the second device does not receive the probing packet, a negative-acknowledgment (NACK) is interpreted by the first device and the first device updates the AUR to a complementary part of the probed interval.

A non-transitory computer-readable storage medium comprising a computer-readable program is presented for establishing communication links in a millimeter wave (mmWave) network, wherein the computer-readable program when executed on a computer causes the computer to perform the steps of determining an active communication link between a first device and a second device, wherein the first device transmits probing packets to the second device, employing a beam search technique to locate narrow beams by triggering the first device to adjust its transmission pattern to cover a fraction of an angular uncertainty region (AUR) at a beginning of a time-slot, and adjusting transmission coefficients of the first device based on a response received from the second device such that if the second device receives a probing packet, the second device sends an acknowledgment (ACK) packet to the first device and the first device updates the AUR such that the AUR is set to a probed angular interval, and if the second device does not receive the probing packet, a negative-acknowledgment (NACK) is interpreted by the first device and the first device updates the AUR to a complementary part of the probed interval.

A system for establishing communication links in a millimeter wave (mmWave) network is presented. The system includes a memory and one or more processors in communication with the memory configured to determine an active communication link between a first device and a second device, wherein the first device transmits probing packets to the second device, employ a beam search technique to locate narrow beams by triggering the first device to adjust its transmission pattern to cover a fraction of an angular uncertainty region (AUR) at a beginning of a time-slot; and adjust transmission coefficients of the first device based on a response received from the second device such that if the second device receives a probing packet, the second device sends an acknowledgment (ACK) packet to the first device and the first device updates the AUR such that the AUR is set to a probed angular interval, and if the second device does not receive the probing packet, a negative-acknowledgment (NACK) is interpreted by the first device and the first device updates the AUR to a complementary part of the probed interval.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The exemplary embodiments of the present invention identify joint beam search and data communication in a time-slotted system with practical consideration such as finite beamwidth resolution and discrete modulation and coding schemes. It is assumed that each time-slot can be used for user location probing or data communication. In probing time-slots, an access point (AP) adjusts the beamwidth to cover a particular angular region and sends a probing packet to determine if the user is located in that region. This reduces the uncertainty of the user location and enables the use of narrower beams in data communication time-slots, where the AP adjusts the beamwidth to cover the entire uncertainty region so as to have a reliable data transmission. Given a number of time-slots, the goal is to discover the best way of utilizing each time-slot to maximize the expected throughput. The exemplary embodiments of the present invention illustrate that the problem satisfies the optimal substructure property, thus enabling the use of a backward dynamic programming approach to find the optimal solution with polynomial computational complexity.

Figure 1:
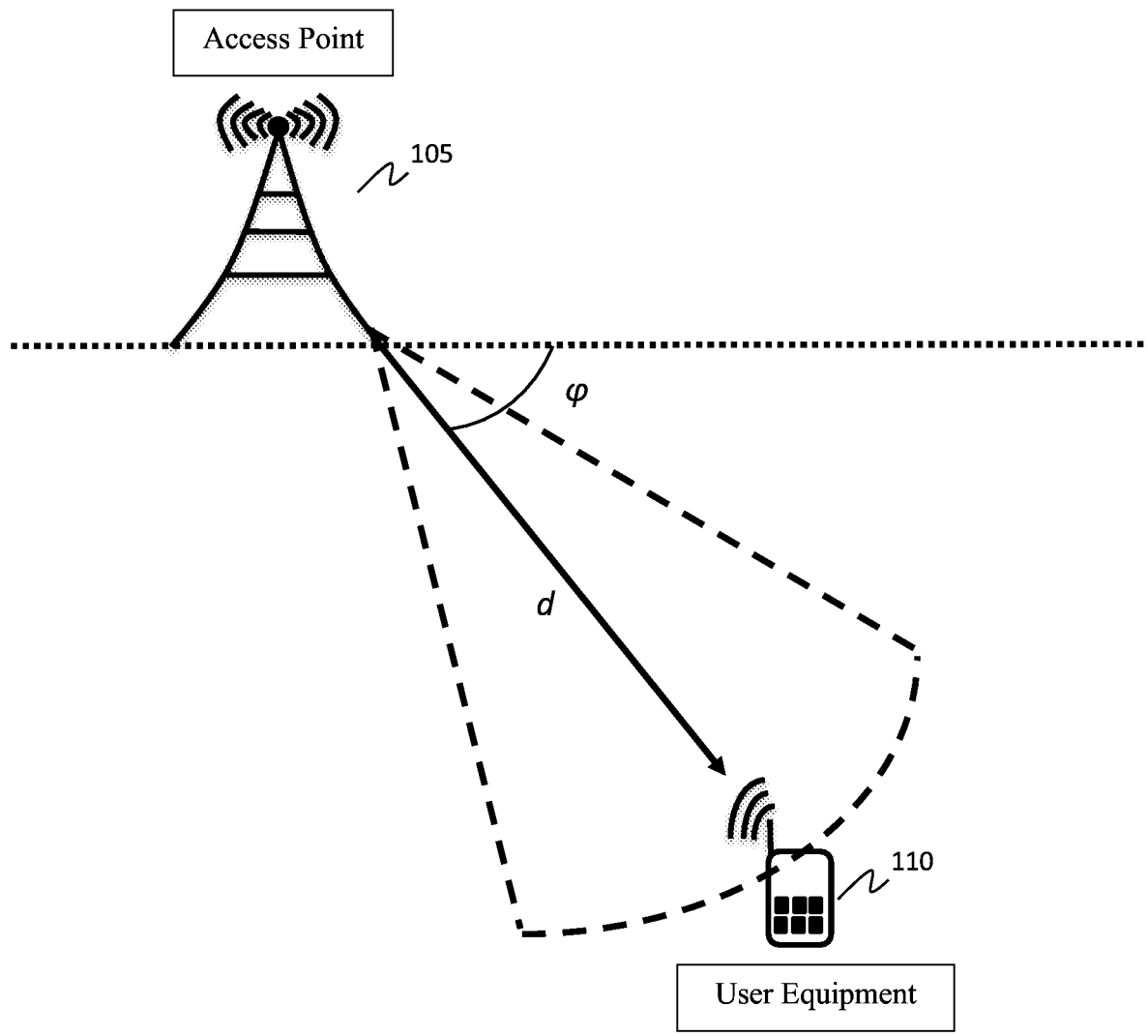
FIG. 1 is a block/flow diagram of a mmWave link between an access point (AP) and user equipment (UE), in accordance with embodiments of the present invention.

In the exemplary embodiments of the present invention, an efficient algorithm is employed for beam search and data communications in millimeter-wave (mmWave) band under practical constraints including finite beam resolutions and calculating throughput based on actual modulation and coding. The exemplary embodiments of the present invention identify a first device, such as an access point (AP) 105, which is seeking communication to a second device 110, such as a user equipment (UE) (FIG. 1). The exemplary embodiments of the present invention maximize an amount of information that can be transmitted in a given time. While only a small amount of data can be communicated at a low rate between these devices while both are employing omni-directional transmission patterns, the method resorts to using a beam search technique to find a narrower beam in order to achieve higher throughput in the remaining time.

In one example, let an angular uncertainty region (AUR) associated with a user be defined as the shortest angular interval in a physical beam domain such that the AP knows that the UE is located in that interval with probability one. The base station (BS) can maintain the communication link by covering the AUR during data transmission. In order to enable the use of narrow beams, the AP can reduce the uncertainty of the user location by a procedure referred to as "probing." In this process, the AP transmits a packet while adjusting its transmission pattern to cover only a fraction of the AUR. As a result, the UE may or may not receive the packet. If the UE receives the packet, the UE sends back an acknowledgement (ACK) packet, the AP updates the AUR, and sets it to the probed interval. Otherwise, the UE does not send back any packet, which is interpreted as a negative acknowledgment (NACK). The AP then uses this information and updates the AUR to the complementary part of the probed interval.

In many practical systems it is possible to take advantage of the probing packets to transmit data in a probabilistic manner.

For example, in time division duplexing (TDD) systems where the frame structure is fixed, e.g., based on the long term evolution (LTE) standard, the UE's feedback may be received with a time delay comparable to the duration of a time-slot. Thus, the AP can take advantage of this time and transmit its data while waiting for the UE's response. This data is transmitted on the same beamwidth used for probing. As a result, the data may or may not be received by the UE depending on whether or not the user is in the probed interval.

For example, in frequency division duplex (FDD) systems, the UE can send back an ACK right after decoding the preamble of the probing packet. However, generation and transmission of the ACK from the UE, as well as processing it by the AP takes time. This time can be used for data transmission. In other words, after decoding the preamble, the UE generates an ACK and transmits the ACK to the AP while continuing to decode the data payload of the received packet.

The exemplary embodiments of the present invention consider the joint problem of initial access and data communication in mmWave bands between two devices, e.g., a first device 105, referred to as an access point (AP) and a second device 110, referred to as the user equipment (UE) in a limited time interval T, as illustrated by FIG. 1. The method assumes that the user is at least quasi-stationary, e.g., stationary in a time interval of interest. Let $\varphi$ denote the angular location of the UE relative to the AP and d be the distance between the two devices 105, 110.

The exemplary embodiments of the present invention further assume that the AP includes a massive antenna array as envisioned for mmWave communications, while the UE has an omni-directional transmission and reception pattern. Using massive arrays, practical beamformers are able to generate a beam that has considerable gain in a particular angular interval called beamwidth. Since the drop-off of the antenna gain after a cut-off angle is not necessarily very sharp, there is a second threshold that defines where the beam is considered to be negligible and between these two angles, it is referred to as an ambiguity angle of the beam pattern.

The exemplary embodiments of the present invention further assume that the ambiguity angle or equivalently the ambiguity region in general is negligible and can be ignored, which leads to the adoption of a sector antenna pattern model characterized by, e.g., three parameters: main-lobe gain G, beamwidth $\theta$, and angular coverage region (ACR) $\Theta$, which is the angular interval covered by a main-lobe of the transmission pattern. Thus, the method has $\theta=|\Theta|$ where $|\cdot|$ denotes an operation which returns the length of an interval (region), e.g., $|[a,b]|=b-a$. In this model, energy conservation implies that $$G = \frac{2\pi}{\theta}.$$

Aside from the possibility of designing beams with arbitrary beam patterns, there is often a practical constraint on the differential changes of the beamwidth between two beams. The method assumes the smallest such changes defined as beamwidth resolution, denoted by $\theta res$, and assumes that the difference between any two beams is an integer multiple of $\theta res$. Furthermore, the method assumes that the narrowest beam has a minimum beamwidth denoted by $\theta min$. Both $\theta res$ and $\theta min$ come from the limitation of the number of the antennas, their spacing and the finite resolution in changing the beam coefficients. In general, such practical limitation forces the system to have finite beams, where for simplicity, the method uses $\theta res$ and $\theta min$ and defines the set of realizable beams as $\vartheta=\{\theta|\theta\geq\theta_{min},\theta/\theta_{res}\in\mathbb{N}\}$.

Figure 2:
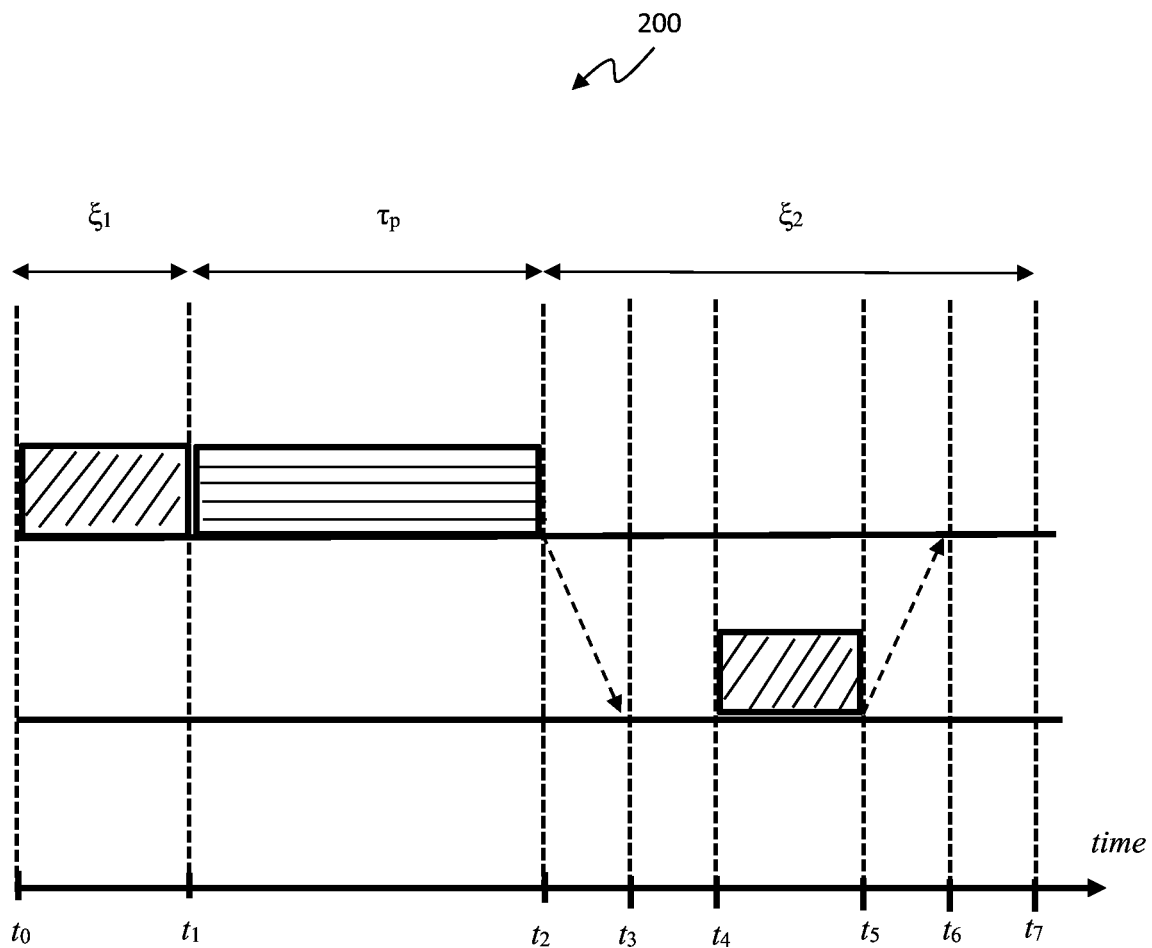
FIG. 2 is a block/flow diagram of a time slot in a time division duplexing (TDD) system, in accordance with embodiments of the present invention.
Figure 3:
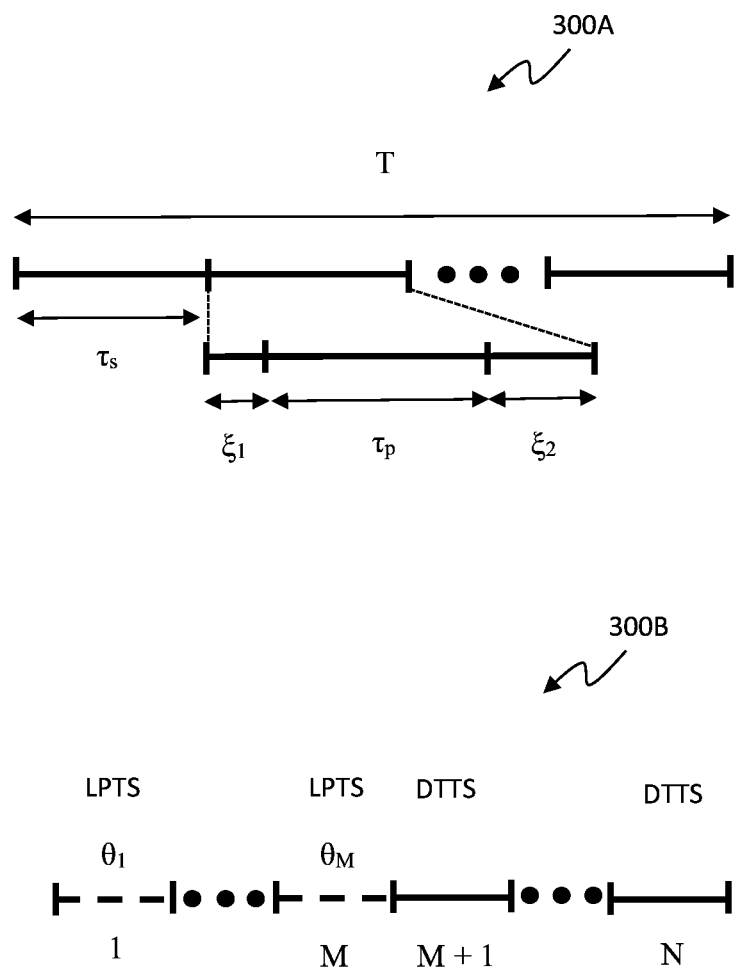
FIG. 3 is a block/flow diagram of (a) a time slotted system and (b) of a time-slotted configuration in an optimal scheme, in accordance with embodiments of the present invention.

The exemplary embodiments of the present invention consider a slotted system, e.g., as in time division duplexing (TDD) protocol in which time is divided into slots with duration $\tau s$, as illustrated in FIG. 3, 300A. As depicted in FIG. 2 each time-slot 200 includes an overhead interval $\xi_1$ such as preamble, address, and control messages from AP, a payload interval $\tau p$, and a second overhead interval $\xi_2$ that includes propagation delay interval, decoding interval, and possible transmission of an acknowledgement (ACK) packet from UE. Let $\xi=\xi_1+\xi_2$ be the total overhead in a time-slot, and then: $\tau s=\xi+\tau p$. Using this slotted time assumption, the number of time-slots in the interval T is denoted by $N \in \mathbb{N}$, which means $T=N\tau_s$.

In practice, the beams of an adaptive antenna system (AAS) can only be modified at particular times that are often realized as multiples of a given time interval. The exemplary embodiments of the present invention assume that the beamforming coefficient can be changed only at the beginning of each time-slot. Consequently, the radiation pattern of the AP is constant during each time-slot.

In the following, a procedure is introduced for joint beam search and data communication. The method first defines the concept of angular uncertainty region (AUR).

The AUR on a user's location at the end of time-slot k, denoted by $\Psi k$, is the shortest angular interval $[a_k, b_k]$, such that the BS knows the angular location of the UE, where phi is in the interval $\Psi k$ with probability 1.

Furthermore, a length of the uncertainty region is defined by $\psi_k \triangleq |\Psi_k|=b_k-a_k$.

Having no prior knowledge about the distribution of the user angular location $\varphi$, the method assumes that $\varphi$, the user angular location, is a random variable uniformly distributed in $\Psi_0$. If $\Psi_0$ is not given, the method can choose $\Psi_0=[0, 2\pi]$.

Let $\Psi_K$ and $\theta_k$, $k=1, 2, \ldots, N$ denote the ACR and the beamwidth used for the transmission at time-slot k, respectively. The method defines two types of time-slot in terms of the ACR adjusted for that slot as follows.

Figure 4:
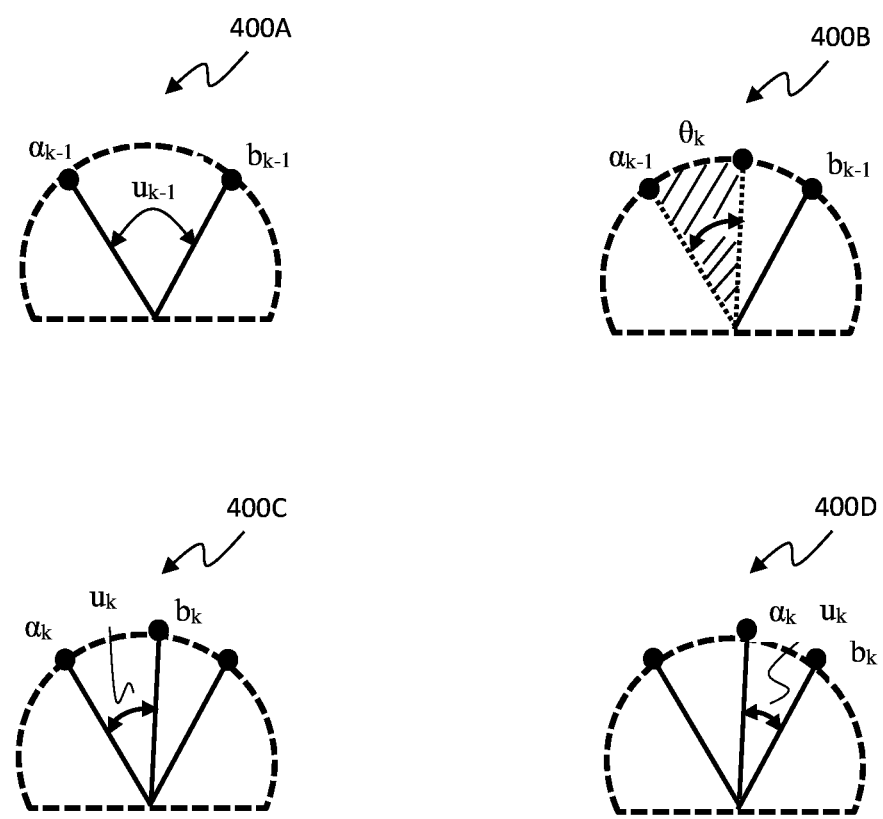
FIG. 4 is a block/flow diagram of (a) angular uncertainty region (AUR) at the end of time-slot k−1, (b) probing a fraction of AUR [ak−1; ak−1+θk], (c) updated AUR if a base station (BS) receives an acknowledgment (ACK) from the user, and (d) updated AUR if the BS does not receive an ACK from the user, in accordance with embodiments of the present invention.

Regarding the first type of time-slot, location probing time-slot (LPTS):

The main goal of LPTS is to shorten the AUR in order to enable the use of narrower beams for data transmission in future time-slots. Assuming that time-slot k is a LPTS and $\Psi_{k-1}=[a_{k-1},b_{k-1}]$ (FIG. 4, 400A), the AP adjusts its radiation pattern to cover a fraction of AUR at the beginning of the time-slot, as depicted in FIG. 4, 400B. In FIG. 4, the method provides $\Theta_k=[a_{k-1},a_{k-1}+\theta_k]$ where $a_{k-1}+\theta_k<b_{k-1}$. Then, the AP transmits a probing packet. If the UE transmits back an ACK, it implies that the user is in the probed angular interval $\Theta_k$.

Consequently, the AUR is updated and the new AUR is set to $\Theta_k$ as illustrated in FIG. 4, 400C. Moreover, payload data of the AP packet is delivered to the UE in this case. On the other hand, if the BS does not receive any ACK from the user, the BS concludes that the user is not in the probed interval and updates the AUR as $\Psi_{k-1}-\Theta_k$ depicted in FIG. 4, 400D. Therefore, the AUR is shortened regardless of the UE feedback and payload data is delivered if an ACK is received. For simplicity, the method considers the scenario where the user sends back an ACK with probability one if it is in the coverage of the AP.

Regarding the second type of time-slot, data transmission time-slot (DTTS):

The main goal of DTTS is to transmit data to the UE. To this end, AP adjusts its angular coverage region (ACR) to cover the entire AUR in the beginning of DTTS and transmits the packet to the UE. Consequently, the UE is in the ACR of the AP and the payload data is delivered successfully, and the UE sends back an ACK in DTTS. Furthermore, the length of the AUR remains unchanged.

The exemplary embodiments of the present invention assume that the communication between the AP and UE is error free, that is, the UE receives the packet correctly as long as it is in the ACR of the AP. Given an initial AUR, the goal is to determine the type of each of N time-slots and specify the ACR of AP for each LPTS to maximize the expected throughput. Note that the only difference between LPTS and DTTS is the ACR used by the AP for transmission. Therefore, it is sufficient to specify the ACR for each time-slot. Furthermore, note that although LPTS shortens AUR, which enables the use of narrower beams for next time-slots, the data of that time-slot will not be delivered if the UE is not located in the probed region. On the other hand, the data is always delivered in DTTS, but AUR remains unchanged.

If slot k is a LPTS, the ACR is a subset of AUR, e.g., $\Theta_k \subset \Psi_{k-1}$ and $\theta_k<\varphi k-1$, whereas $\Theta_k=\Psi_{k-1}$ and $\theta_k=\psi_{k-1}$ if slot k is a DTTS. Let $A_k$ denote a binary random variable which is one if the UE sends back an ACK at the end of time-slot k and zero otherwise. Therefore, the AUR is updated at the end of time-slot k as follows:

$$\Psi_k = \begin{cases} \Theta_k & \text{if } A_k = 1, \\ \Psi_{k-1} - \Theta_k & \text{if } A_k = 0. \end{cases} \quad (1)$$

Initially, the method assumes that the angular location of UE relative to the AP is uniformly distributed in $\Psi_0$. This assumption is due to the fact that no side information is had at first. The method also assumes that $\psi_0 \in \vartheta$. The following lemma demonstrates that the distribution remains uniform at the end of each time-slot after receiving ACK/NACK.

Regarding lemma 1, the angular location of the UE is uniformly distributed in $\Psi_k$ at the end of time-slot $k \in \{1, 2, \ldots, N\}$, i.e. $\phi \sim \text{Uniform}(\Psi_k)$.

As a result of lemma 1, the method can derive the distribution of $A_k$ as follows:

As $\phi \sim \text{Uniform}(\Psi_{k-1})$ at the beginning of slot k, $A_k$ is a Bernoulli random variable with $$P(A_k = 1) = \frac{\theta_k}{\psi_{k-1}}.$$

A policy Q for determining the ACR of each time-slot gets the sequence of previously observed ACK/NACK, and decides on the ACR for the current time-slot. The random vector is defined as:

$$A_Q^{(k)}=[A_{1,Q}, \ldots, A_{k,Q}], k=1,2,\ldots,N,$$

where $A_{k,Q}$ is a binary random variable which describes user feedback at time-slot k when policy Q is applied. Therefore, policy Q gets the realization of $A_Q^{(k)}$ at the beginning of time-slot k+1 as input and returns $\theta_{k+1,Q}$ as output. The method defines the amount of data traffic delivered to the UE when using policy Q as:

$$U_Q = \sum_{k=1}^{N} \tau_P R(\theta_{k,Q}) \mathcal{I}(A_{k,Q} = 1), \quad (2)$$

where I(E) is the indicator of the event E, and R($\theta$) is the data rate of the UE if it is in the coverage of the AP using beamwidth $\theta$. Note that $U_Q$ is a rnadom variable since it is a function of random vector $A_Q^{(N)}$.

Furthermore, the method defines:

$$R(\theta)=f(SNR(\theta)), \quad (3)$$

where, SNR($\theta$) is the signal to noise ratio as a function of beamwidth $\theta$, and f is a function relating data rate to SNR. As an example, the method may use the Shannon capacity formula $f=W\log_2(1+SNR)$, where W is the communication bandwidth. In practical scenarios where discrete modulation and coding schemes are used, f is a staircase function. Given a beamwidth θ, the SNR is defined as $$SNR(\theta) = \frac{PG(\theta)}{N_0 WL(d)}$$
(5)

where, P is the AP transmit power, $G(\theta)=2\pi/\theta$ is the BF gain, $N_0$ is the noise spectral density, and L(d) is the pathloss depending on the distance d between the AP and the UE.

Given the initial AUR $\Psi_0$, the goal is to find policy Q maximizing the expected throughput in N time-slots. Thus the problem can be formulated as:

$$Q^* = \underset{Q}{\mathrm{argmax}} \frac{1}{N\tau_s} \mathbb{E}(U_Q | \Psi_0)$$
(4)

The following lemma characterizes the general structure of the time-slots under the optimal policy maximizing the expected throughput.

Regarding lemma 2, under optimal policy Q*, no location probing time-slot should be used after any data transmission time-slot.

The main idea of the proof is to use a cut and paste technique to swap the LPTS with the DTTS, which has been used before it and show that the expected throughput increases after the exchange. Lemma 2 implies that in the optimal scheme, the method has a group of successive probing time-slots first (if there is any) followed by data transmission time-slots filling up the remaining time until T, as illustrated by FIG. 3, 300B. In FIG. 3, there are M location probing slots and N−M data transmission slots.

Lemma 2 reveals a property of the problem referred to as optimal substructure property, which implies that the optimal solution to the problem includes the optimal solutions to the sub-problems. Therefore, the problem can be modeled as a finite horizon stopping problem and the method can use a backward dynamic programming approach to solve it in a recursive manner. Since the method must stop at time-slot N, the method first finds the optimal decision at time-slot N−1 (e.g., $\theta N^{-1}$). Then, knowing the optimal rule at stage N−1, the method finds the optimal decision at slot N−2 and so on, back to the initial time-slot.

According to lemma 2, there are two possibilities at the time-slot k. The method can choose to use time-slot k and all the subsequent time-slots as DTTS, or the method can use time-slot k as a LPTS. Before elaborating on the described approach, the method investigates the values that $\psi_k$ can take in the following lemma.

Regarding lemma 3, the length of the uncertainty region at the end of time-slot $k \in \{1, 2, \ldots, N\}$ satisfies $\psi_k \in \vartheta$ if $\psi_k \geq \theta_{min}$.

Note that according to lemma 3, $\psi_k$ can only take the value belonging to $\vartheta$ if $\psi_k \geq \theta_{min}$. On the other hand, if $\psi_k \theta_{min}$, it is straightforward that every time-slot after slot k should be DTTS as the AP cannot reduce the uncertainty any further due to the minimum supportable beamwidth constraint. Next, the method uses this property to solve the problem with reasonable computational complexity.

To elaborate, let $X(\psi_{k-1},k)$ denote the maximum expected data traffic delivered to the UE from the beginning of time-slot k until the end of the last time-slot (e.g., in the time interval $[(k-1)\tau_s, N\tau_s]$). Note that $X(\psi_0, 1) = \mathbb{E}(U_{Q^*} | \Psi_0)$, and hence the ultimate goal is to find $X(\psi_0 1)$ and the corresponding policy Q achieving it.

For $k \in \{1, 2, \ldots, N\}$:

$$X(\psi_{k-1},k) = \max\{Y(\psi_{k-1},k), Z(\psi_{k-1},k)\}$$
(5)

$$X(\psi_N, N+1) = 0,$$
(6)

where, (5) is followed by optimal substructure property and (6) is the finite horizon condition. $Y(\psi_{k-1},k)$ is the expected data traffic delivered to the UE in the interval $[(k-1)\tau_s, N\tau_s]$, if the method selects to use time-slot k and all the subsequent time-slots) as DTTS. Moreover, $Z(\psi_{k-1},k)$ is the maximum expected data traffic in the interval $[(k-1)\tau_s, N\tau_s]$, if the method selects to use time-slot k as LPTS.

As a result, time-slot k is chosen to be a DTTS if $Y(\psi_{k-1},k) \geq Z(\psi_{k-1},k)$ and LPTS, otherwise.

Next, it is described how to calculate the values of $Y(\psi_{k-1},k)$ and $Z(\psi_{k-1},k)$.

There are N−k+1 time-slots in the interval $[(k-1)\tau_s, N\tau_s]$. Therefore, for $k \in \{1, 2, \ldots, N\}$, the method provides:

$$Y(\psi_{k-1},k) = (N-k+1)\tau_p R(\max\{\psi_{k-1}, \theta_{min}\}).$$
(7)

Note that $Y(\psi_{k-1},k)$ can be computed for every value that $\psi_{k-1}$ can take. The term $\max\{\psi_{k-1}, \theta_{min}\}$ ensures that the beamwidth taken by AP is feasible. If $\psi_{k-1} \geq \theta_{min}$, then $\psi_{k-1}$ is a feasible beamwidth according to lemma 3. Otherwise, the max operator in (7) guarantees that the beamwidth is feasible. As a result, the computational complexity of calculating $Y(\psi_{k-1},k)$ using (7) for k=1, 2, ..., N and every possible value of $\psi_{k-1}$ is $\mathcal{O}(N|\vartheta|)$.

Furthermore, the method defines:

$$Z(\psi_{k-1}, k) = \begin{cases} \tilde{Z}(\theta_k^*(\psi_{k-1}), \psi_{k-1}, k), & \text{if } \psi_{k-1} > \theta_{min} \\ 0 & \text{if } \psi_{k-1} \leq \theta_{min} \end{cases}$$
(8)

Where, $\tilde{Z}(\theta_k, \psi_{k-1}, k)$, k=1, 2, ..., N is provided in (10). $\theta_k^*(\psi_{k-1})$ is the optimal beamwidth maximizing the expected traffic delivered to the UE in the interval $[(k-1)\tau_s, N\tau_s]$, if slot k is chosen to be LPTS.

Consequently, the method provides:

$$\theta_k^*(\psi_{k-1}) = \underset{\substack{\theta_k \in \vartheta \\ \theta_k < \psi_{k-1}}}{\mathrm{argmax}} \tilde{Z}(\theta_k, \psi_{k-1}, k).$$
(9)

Note that in (8), the method provides $Z(\psi_{k-1},k) = 0$ for $\psi_{k-1} \leq \theta_{min}$ since in that case the uncertainty region cannot become shorter by location probing due to the minimum beamwidth constraint.

Therefore, the best choice is to use time-slots k, k+1, ..., N as DTTS if $\psi_{k-1} \leq \theta_{min}$.

This can be ensured by checking (5), (7), and (8) $\psi_{k-1} \leq \theta_{min}$.

It is straightforward that in such scenarios the method provides:

$$Y(\psi_{k-1},k) > Z(\psi_{k-1},k) = 0 \text{ and } X(\psi_{k-1},k) = Y(\psi_{k-1},k).$$

Another point is the feasibility of optimization problem (9). From (8), it is straightforward that the method uses (9) only if $\psi_{k-1} > \theta_{min}$.

Consequently, whenever the method uses (9), $\theta_k = \theta_{min}$ is a feasible solution for the optimization problem.

In (10), $P_{ack}(\theta_k,\psi_{k-1})$ denotes the probability of receiving and ACK from the UE at the end of slot k.

Accordingly, the method provides:

$$P_{ack}(\theta_k, \psi_{k-1}) = \frac{\theta_k}{\psi_{k-1}}.$$

The first term in (10) is the expected data traffic delivered to the UE in the interval $[(k-1)\tau_s, N\tau_s]$, if the UE sends back an ACK at the end of slot k. The second term in (10) defines the same quantity if the UE feedback is NACK at the end of slot k.

Algorithm 1, reproduced below, provides a step-by-step description of a backward) dynamic programming approach to calculate and $X(\psi_{k-1},k)$, $Y(\psi_{k-1},k)$, and $Z(\psi_{k-1},k)$.

Furthermore, Algorithm 1 generates $L(\psi_{k-1},k)$ which defines the optimal label (type) for time-slot k as a function of the length of AUR at the beginning of slot k, e.g., $\psi_{k-1}$.

The reason the method uses a backward method is that the best decision at any time-slot depends on the best decisions for the next time-slot according to the optimal substructure property (see (5),(8), and (10)). Therefore, the method starts from time-slot k=N (e.g., the last time-slot) and iterates back to time-slot k=1.

At time-slot k, the method provides:
$X(\psi_{k-1},k)=(N-k+1)\tau_p R(\theta_{min})$ according to (5), (7), and (8).

On the other hand, if $\psi_{k-1} \leq \theta_{min}$, then according to lemma 3, the method provides: $\psi_{k-1} \in \vartheta$.

Hence, the method only needs to calculate $X(\psi_{k-1},k)$ for $\psi_{k-1} \in \vartheta$.

To this end, the method first solves the optimization problem (9) to find the value of $\theta_k^*(\psi_{k-1})$.

For any $\psi_{k-1} \in \vartheta$, this can be done by a search over the set $\{\theta_k | \theta_k \in \vartheta, \theta_k < \psi_{k-1}\}$.

Consequently, $Z(\psi_{k-1},k)$ can be calculated by using (8) for every $\psi_{k-1} \in \vartheta$.

$Y(\psi_{k-1},k)$ is also computed using (7). Then, the larger value between $Z(\psi_{k-1},k)$ and $Y(\psi_{k-1},k)$ is assigned to $X(\psi_{k-1},k)$.

For every $\psi_{k-1} \in \vartheta$ base on (5).

If $Y(\psi_{K-1},k) \geq Z(\psi_{k-1},k)$, then the method stops using LPTS and all the slots k, k+1, ..., N are used as DTTS. On the other hand, if $Y(\psi_{k-1},k) < Z(\psi_{k-1},k)$, the method uses slot k as LPTS with beamwidth $\theta$.

The optimal strategy is built by Algorithm 1. In practice, at the beginning of time-slot k, the value of $\psi_{k-1}$ is known, which is a function of the sequence of previously observed ACK/NACK as well as the initial uncertainty $\psi_0$.

Therefore, the method can check the value of $L(\psi_{k-1},k)$. If $L(\psi_{k-1},k)=1$, then the method needs to use time-slot k as a LPTS and the probing beamwidth is given by $\theta_k^*(\psi_{k-1})$.

Otherwise, if $L(\psi_{k-1},k)=0$, then time-slot k and all the subsequent time-slots should be used as DTTS.

---

Algorithm 1 Optimal Beam Search and Data Communication

1: for k = N to 1 step −1 do
2:   Set $X(\psi_{k-1}, k) = (N − k + 1)\tau_p R(\theta_{min})$ for $\psi_{k-1} \leq \theta_{min}$.
3:   Set $L(\psi_{k-1}, k) = 0$.
4:   for $\psi_{k-1} \in \vartheta - \{\theta_{min}\}$ do
5:     Calculate $Y(\psi_{k-1}, k)$ using (7).
6:     Solve (9) to find $\theta_k^*(\psi_{k-1})$.
7:     Substitute $\theta_k^*(\psi_{k-1})$ in (8) to calculate $Z(\psi_{k-1}, k)$.
8:     if $Y(\psi_{k-1}, k) \geq Z(\psi_{k-1}, k)$ then

---

Algorithm 1 Optimal Beam Search and Data Communication

9:       Set $L(\psi_{k-1}, k) = 0$.
10:      Set $X(\psi_{k-1}, k) = Y(\psi_{k-1}, k)$.
11:    else
11:      Set $L(\psi_{k-1}, k) = 1$.
13:      Set $X(\psi_{k-1}, k) = Z(\psi_{k-1}, k)$.
14:    end if
15:  end for
16: end for

---

A minor modification of Algorithm 1 enables the method to find the optimal strategy if data transmission is restricted only to DTTSs. In this case, the payload data of probing packets is not used. To find the optimal strategy in this scenario, the method can use Algorithm 1, but with a modified version of (10), which does not include the term $\tau_p R(\theta_k)$ in the first expression.

The computational complexity of each iteration of the outer loop in Algorithm 1 is $\mathcal{O}(|\vartheta|^2)$. The reason is the inner loop has $|\vartheta|-1$ iterations and at each iteration the method performs a search over the set $\{\theta_k | \theta_k \in \vartheta, \theta_k > \psi_{k-1}\}$ to solve (9) and find $\theta_k^*(\psi_{k-1})$.

Therefore, the overall computational complexity of Algorithm 1 is $\mathcal{O}(N|\vartheta|^2)$ as the number of iterations is N in the outer loop. It is observed that the complexity is linear with the number of time-slots and quadratic with the number of discrete levels of beamwidth supported by the AP.

The adaptation of known beam search algorithms to the model described above is now performed. More specifically, the exhaustive search (ES) and bisection search (BS) algorithms are investigated. The exemplary embodiments of the present invention further identify a heuristic fractional search (FS) algorithm.

In the ES algorithm, the initial AUR $\Psi_0$ is divided into M non-overlapping sectors each with length of where $\psi_0/M$, where $2 \leq M \leq N$ is the algorithm parameter. The AP adjusts ACR to cover one sector per time-slot until it finds the sector in which the UE is located. Then it keeps the ACR unchanged in the remaining time-slots to communicate with the user. Next, this procedure is described with another point of view which will be used later to consider the beamwidth restrictions. In the first time-slot, the AP probes a sector with angular span of $\psi_0/M$, i.e., $\theta_1 = \psi_0/M$.

If the UE sends back an ACK in the end of the first time-slot, e.g., $A_1=1$, all the subsequent time-slots are considered as DTTS and the AP uses the same ACR for data transmission. Otherwise, if $A_1=0$, the method provides $$\psi_1 = \psi_0 - \theta_1 = \frac{M-1}{M}\psi_0.$$

Furthermore, the second time-slot is used as LPTS and the AP sets the beamwidth to $\theta_2 = \psi_1/(M-1)$. If $A_2=1$, time-slots 3, 4, ..., N are used as DTTS and the ACR is set to the one used in time-slot 2. If $A_2=0$, the method provides $$\phi_2 = \phi_1 - \theta_2 = \frac{M-2}{M}\psi_0$$

and the AP uses beamwidth $\theta_3 = \phi_2/M-2)$ to probe a sector with span of $\psi_0/M$ in the third time-slot. This procedure repeats until time-slot M−1.

If the AP does not find the user in the first M−1 time-slot (e.g., if $A_k=0$, k=1, 2, ..., M−1), it concludes that the user is in the last sector and does not probe that sector. Instead, it uses the time-slots M, ..., N as DTTS in that case and adjusts its beamwidth to cover the last sector. In order for the beamwidth values in this procedure to be feasible, the procedure is slightly modified to ensure the feasibility.

In the modified version, the beamwidth at time-slot k is set to:

$$\theta_k^{es} = \begin{cases} \mathbb{P}\left(\frac{\psi_{k-1}}{M-k+1}\right) & \text{if } k \leq \min(k^*, M-1), \\ \psi_{k-1} & \text{if } k > \min(k^*, M-1), \end{cases} \quad (11)$$

where $k^*$ is the index of the time-slot at the end of which the AP receives the first ACK from the UE.

Furthermore, $\mathbb{P}(\omega)$ is the closest feasible beamwidth which can cover a sector with angular span of ω, e.g., the method provides $\mathbb{P}(\omega) = \min(\{\theta | \theta \in \vartheta, \theta \geq \omega\})$. Note that this mapping is employed to satisfy the beamwidth constraint at each time-slot.

In the BS algorithm, the AP uses the first M slots as LPTS and the remaining slots as DTTS, where 1≤M≤N is the algorithm parameter. Furthermore, at the beginning of each probing time-slot, the AUR is divided into two equal sectors and the AP probes one of them using the closest feasible beamwidth that can cover that sector.

More specifically, the method provides:

$$\theta_k^{bs} = \begin{cases} \mathbb{P}\left(\frac{\psi_{k-1}}{2}\right) & \text{if } k \leq M, \\ \psi_{k-1} & \text{if } k > M. \end{cases} \quad (12)$$

Next the heuristic FS algorithm is described according to the exemplary embodiments of the present invention. As in BS, the first M slots are used as LPTS in FS. As opposed to BS, at the beginning of each probing time-slot, the AUR is divided into two unequal sectors and the AP probes the larger one using the closest feasible beamwidth that can cover that sector. More specifically, assuming that time-slot k is a LPTS, the AUR $\Psi_k-1$ is divided into two sectors with lengths $\gamma_k\psi_{k-1}$ and $(1-\gamma_k)\psi_{k-1}$, where $$\gamma_k = 0.5\left(1 + \frac{k-1}{M-1}\right)$$

and the former sector is probed.

Therefore, the method provides:

$$\theta_k^{fs} = \begin{cases} \mathbb{P}(\gamma_k\psi_{k-1}) & \text{if } k \leq M, \\ \psi_{k-1} & \text{if } k > M. \end{cases} \quad (13)$$

Without any restriction on the beamwidth values, the expected throughput of ES and BS algorithms can be derived analytically. However, it is difficult to provide closed form expressions with such practical constraints. Consequently, the method uses the result of lemma 1 and provides a recursive procedure to evaluate the performance of ES and BS.

Algorithm 2, reproduced below, introduces this procedure where m∈ {ES,BS,FS} is the flag which specifies the method. Binary flag $f_d$ determines if the data payload of the probing packets is used. If $f_d=1$, data is sent during probing and not otherwise. This difference is reflected in lines 20 and 22 of Algorithm 2.

In Algorithm 2, k is the time-slot index and γ represents the fraction of the uncertainty region intended to be covered by the beamwidth at each time-slot. Furthermore, the value of γ for each time-slot is determined according to (11), (12), and (13) for ES, BS, and FS methods, respectively.

In order to find the expected throughput of ES method given the value of initial uncertainty $\psi_0$ and parameter M, the method uses $B_{ES}=A(\psi_0, 1, M, 1/M, f_d, \text{'ES'})$ where $B_{ES}$ is the corresponding expected throughput.

Similarly, the method uses:
$B_{BS}=A(\psi_0,1,M,0.5,f_d,\text{'BS'})$ and $B_{FS}=A(\psi_0,1,M,0.5,f_d,\text{'FS'})$ to find the expected throughput in BS and FS methods, respectively.

---

Algorithm 2 $B_m = A(\psi, k, M, \gamma, f_d, m)$

---

1: if ψ = 0 then
2:    B = 0
3: else if k = M then
4:    B = (N − M)$\tau_p$R(ψ)
5: else
6:    θ = P(γψ)
7:    p' = θ/ψ, p'' = 1 − p'
8:    ψ' = θ
9:    if ψ − θ < $\theta_{min}$ then
10:     ψ'' = $\theta_{min}$
11:    else
12:     ψ'' = ψ − θ
13:    end if
14:    if m = 'ES' then
15:     γ' = 1, γ'' = 1/(M − k)
16:    else if m = 'BS' then
17:     γ' = 0.5, γ'' = 0.5
18:    else if m = 'FS' then
19:     $\gamma' = 0.5(1 + \frac{k}{M-1}), \gamma'' = 0.5(1 - \frac{k}{M-1})$
20:    end if
21:    if $f_d$ = 1 then
22:     B = p'[$\tau_p$R(θ) + A(ψ', k + 1, M, γ', $f_d$, $f_m$)] + p''A(ψ'', k + 1, M, γ'', $f_d$, $f_m$)
23:    else
24:     B = p'A(ψ', k + 1, M, γ', $f_d$, $f_m$) + p''A(ψ'', k + 1, M, γ'', $f_d$, $f_m$)
25:    end if
26: end if

---

In conclusion, in the exemplary embodiments of the present invention, the problem of joint beam search and data communication in a time-slotted system was analyzed. In this problem, each time-slot can be used for location probing (LPTS) or for data communication (DTTS). Given a finite number time-slots, the goal was to find the best type for each time-slot to maximize the expected throughput. It was proved that the problem satisfies the optimal substructure property, which enabled the use a backward dynamic programming approach to find the optimal solution. A complexity analysis revealed that the computational complexity of the proposed approach is linear with the number of time-slots and quadratic with the number of feasible beamwidth values at the access point.

Figure 5:
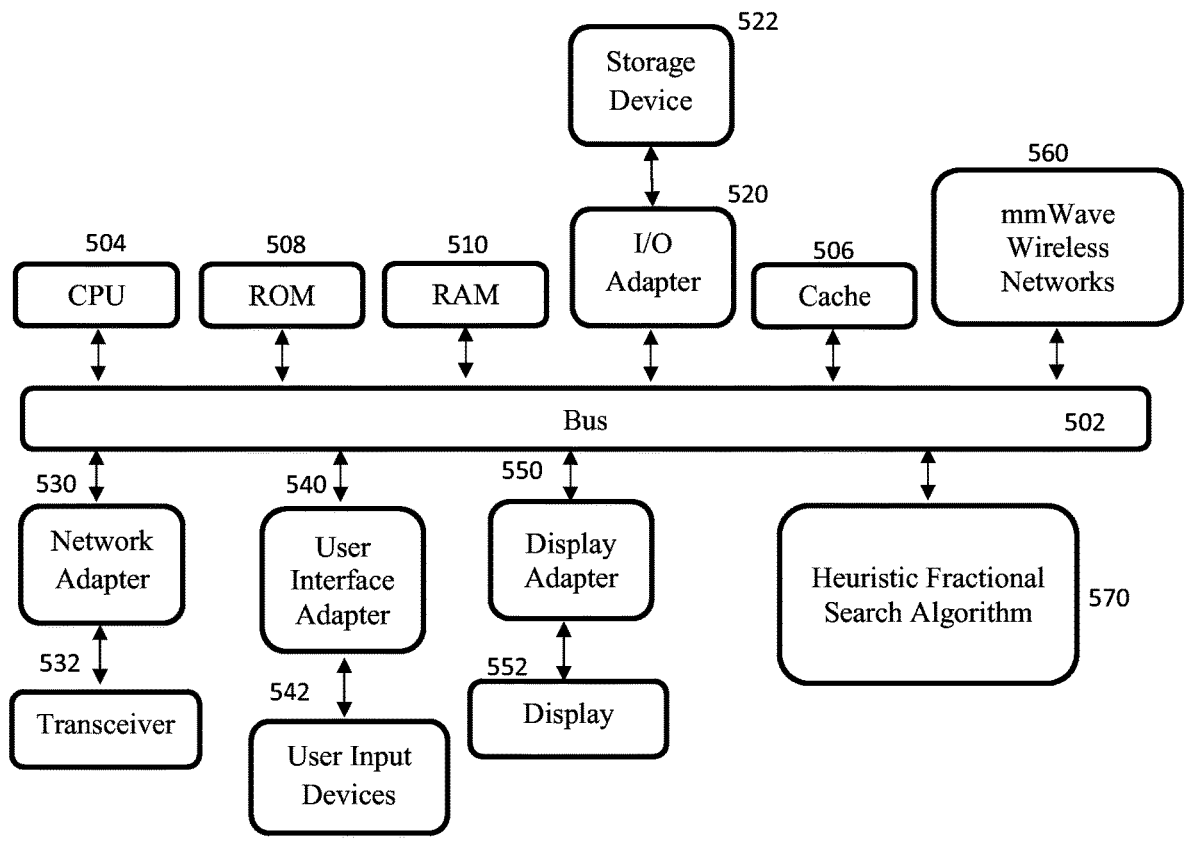
FIG. 5 is block/flow diagram of an exemplary processing system for establishing communication links in a millimeter wave (mmWave) network, in accordance with embodiments of the present invention.

FIG. 5 is block/flow diagram of an exemplary processing system for establishing communication links in a millimeter wave (mmWave) network, in accordance with embodiments of the present invention.

The processing system includes at least one processor or processor device (CPU) 504 operatively coupled to other components via a system bus 502. A cache 506, a Read Only Memory (ROM) 508, a Random Access Memory (RAM) 510, an input/output (I/O) adapter 520, a network adapter 530, a user interface adapter 540, and a display adapter 550, are operatively coupled to the system bus 502. MmWave networks 560 can be connected to bus 502. The mmWave networks 560 can employ a heuristic fractional search algorithm 570.

A storage device 522 is operatively coupled to system bus 502 by the I/O adapter 520. The storage device 522 can be any of a disk storage device (e.g., a magnetic or optical disk storage device), a solid state magnetic device, and so forth.

A transceiver 532 is operatively coupled to system bus 502 by network adapter 530.

User input devices 542 are operatively coupled to system bus 502 by user interface adapter 540. The user input devices 542 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 542 can be the same type of user input device or different types of user input devices. The user input devices 542 are used to input and output information to and from the processing system.

A display device 552 is operatively coupled to system bus 502 by display adapter 550.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
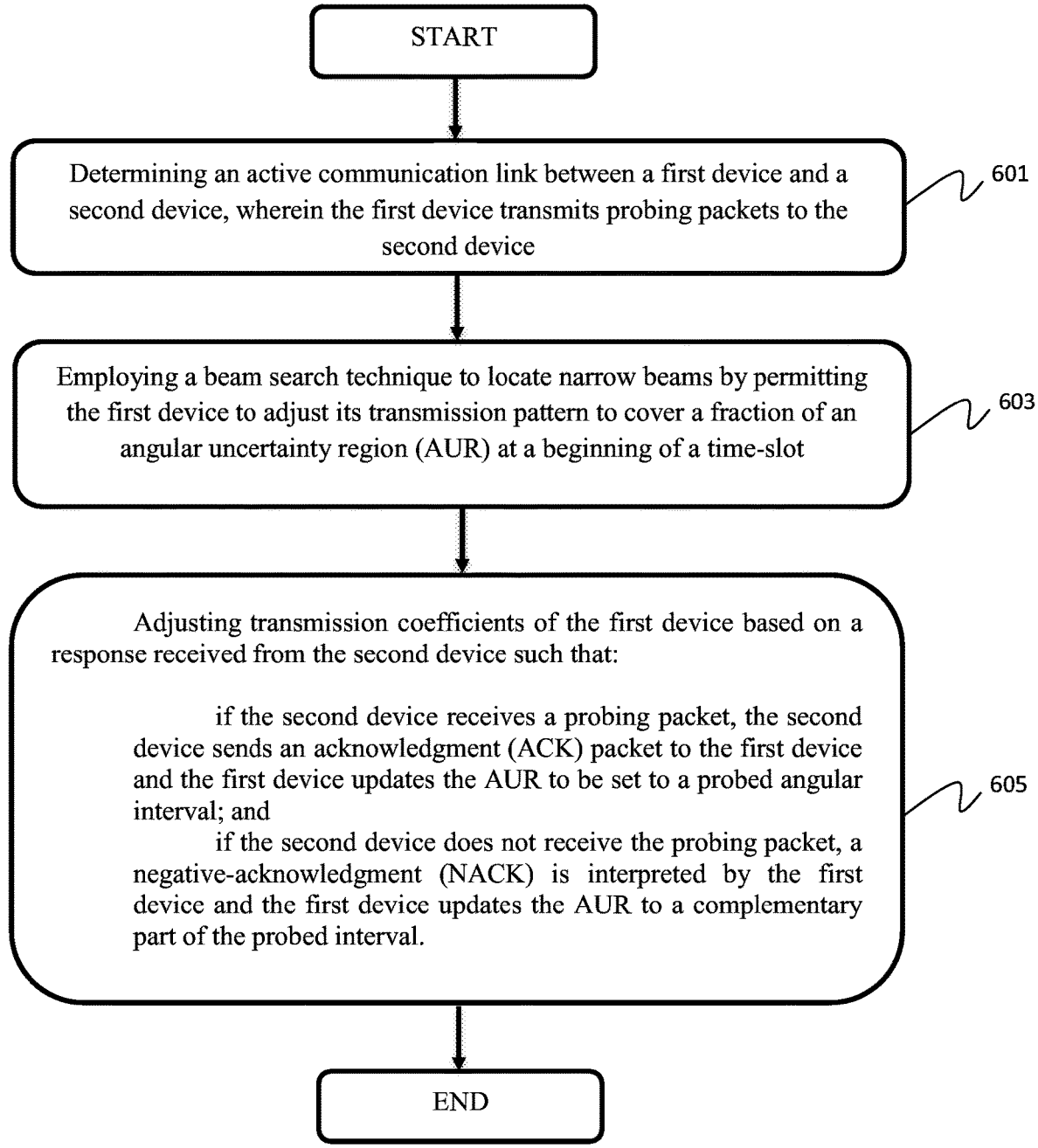
FIG. 6 is a block/flow diagram of an exemplary method establishing communication links in a millimeter wave (mmWave) network, in accordance with embodiments of the present invention.

FIG. 6 is a block/flow diagram of an exemplary method establishing communication links in a millimeter wave (mmWave) network, in accordance with embodiments of the present invention.

At block 601, an active communication link is determined between a first device and a second device, wherein the first device transmits probing packets to the second device.

At block 603, a beam search technique is employed to locate narrow beams by triggering the first device to adjust its transmission pattern to cover a fraction of an angular uncertainty region (AUR) at a beginning of a time-slot.

At block 605, transmission coefficients of the first device are adjusted based on a response received from the second device such that if the second device receives a probing packet, the second device sends an acknowledgment (ACK) packet to the first device and the first device updates the AUR to be set to a probed angular interval, and if the second device does not receive the probing packet, a negative-acknowledgment (NACK) is interpreted by the first device and the first device updates the AUR to a complementary part of the probed interval.

In summary, the exemplary embodiments of the present invention identify a method implemented in wireless communication systems where the method includes transmission of probing packets from a first wireless device and reception of acknowledgment from a second wireless device, and adjusting the transmission coefficients of the first wireless device based on the response from the second wireless device, the response being a received signal (ACK) or not receiving a signal in a given time interval (NACK). The probing packet is also used to carry information from the first transmission device to the second transmission device. The beamforming uses the beamwidth adjusted based on the received signal from the second transmission device. The beamforming vectors are from a codebook such that the beamwidths are integer multiples of a base beamwidth, which is defined as beamforming resolution, which is the smallest beam that is deployed by the wireless communication system including the first and second wireless devices.

Moreover, after the response from the second device, a fraction of the beamwidth is used in the next probing packet. It is noted that the fractions are all greater or equal to ½. A transmission frame includes a series of probing packets followed by data transmission and the beamwidth used in the data transmission interval is found based on the last probing packet and the reply of the second device to this last probing packet. The series of fractions can be presented in decreasing order. In one example, the fractions are functions of the initial beamwidth, the beam forming resolution, and the available rates in modulation and coding schemes. In another example, the fractions are functions of the system overhead including control signals, preambles, propagation delay, and processing delay. The fraction beamwidth used in a next probing packet is a function of the response from the first device and the fractions of the beamwidth for the case of ACK and NACK have an overlap.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device;
    wherein the second device sends an acknowledgment (ACK) packet to the first device and the first device updates the AUR such that the AUR is set to a probed angular interval when the second device receives a probing packet; and
    a negative-acknowledgment (NACK) is interpreted by the first device and the first device updates the AUR to a complementary part of the probed interval when the second device does not receive the probing packet.

2. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device; and
    transmission of a series of probing packets followed by data transmission, wherein the beamwidth used in a data transmission interval is found based on a last probing packet and a reply of the second device to this last probing packet.

3. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device;
    wherein the fractions are functions of an initial beamwidth, a beam forming resolution, and an available rate in modulation and coding schemes.

4. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device;
    wherein the fractions are functions of a system overhead including control signals, preambles, propagation delay, and processing delay.

5. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device;
    wherein a beam used for the transmission is selected from a finite set that includes beams with beamwidths that are integer multiples of a base beamwidth.

6. A computer-implemented method executed in a wireless communication system for establishing communication links in a millimeter wave (mmWave) network, the method comprising:
    determining an active communication link between a first device and a second device, wherein the first device transmits probing packets to the second device;
    employing a beam search technique to locate narrow beams by triggering the first device to adjust its transmission pattern to cover a fraction of an angular uncertainty region (AUR) at a beginning of a time-slot; and
    adjusting transmission coefficients of the first device based on a response received from the second device;
    wherein the AUR is updated at the end of a time-slot as follows:

$$\Psi_k = \begin{cases} \Theta_k & \text{if } A_k = 1, \\ \Psi_{k-1} - \Theta_k & \text{if } A_k = 0 \end{cases}$$

where $\Psi_k$ denotes the AUR, k denotes a time-slot, $\Theta_k$ denotes an angular coverage region, and $A_k$ denotes a binary random variable which is one if the second device transmits the ACK at the end of time-slot k and zero otherwise.

7. A non-transitory computer-readable storage medium comprising a computer-readable program for establishing communication links in a millimeter wave (mmWave) network, wherein the computer-readable program when executed on a computer causes the computer to perform the steps of:
    determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device;

wherein the second device sends an acknowledgment (ACK) packet to the first device and the first device updates the AUR such that the AUR is set to a probed angular interval when the second device receives a probing packet; and a negative-acknowledgment (NACK) is interpreted by the first device and the first device updates the AUR to a complementary part of the probed interval when the second device does not receive the probing packet.

8. A non-transitory computer-readable storage medium comprising a computer-readable program for establishing communication links in a millimeter wave (mmWave) network, wherein the computer-readable program when executed on a computer causes the computer to perform the steps of:

determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device; and transmission of a series of probing packets followed by data transmission, wherein the beamwidth used in a data transmission interval is found based on a last probing packet and a reply of the second device to this last probing packet.

9. A non-transitory computer-readable storage medium comprising a computer-readable program for establishing communication links in a millimeter wave (mmWave) network, wherein the computer-readable program when executed on a computer causes the computer to perform the steps of:

determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device;

wherein the fractions are functions of an initial beamwidth, a beam forming resolution, and an available rate in modulation and coding schemes.

10. A non-transitory computer-readable storage medium comprising a computer-readable program for establishing communication links in a millimeter wave (mmWave) network, wherein the computer-readable program when executed on a computer causes the computer to perform the steps of:

determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device;

wherein the fractions are functions of a system overhead including control signals, preambles, propagation delay, and processing delay.

11. A non-transitory computer-readable storage medium comprising a computer-readable program for establishing communication links in a millimeter wave (mmWave) network, wherein the computer-readable program when executed on a computer causes the computer to perform the steps of:

determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device;

wherein a beam used for the transmission is selected from a finite set that includes beams with beamwidths that are integer multiples of a base beamwidth.

12. A non-transitory computer-readable storage medium comprising a computer-readable program for establishing communication links in a millimeter wave (mmWave) network, wherein the computer-readable program when executed on a computer causes the computer to perform the steps of:

determining an active communication link between a first device and a second device, wherein the first device transmits probing packets to the second device;

employing a beam search technique to locate narrow beams by triggering the first device to adjust its transmission pattern to cover a fraction of an angular uncertainty region (AUR) at a beginning of a time-slot; and adjusting transmission coefficients of the first device based on a response received from the second device;

wherein the AUR is updated at the end of a time-slot as follows:

$$\Psi_k = \begin{cases} \Theta_k & \text{if } A_k = 1, \\ \Psi_{k-1} - \Theta_k & \text{if } A_k = 0 \end{cases}$$

where $\Psi_k$ denotes the AUR, k denotes a time-slot, $\Theta_k$ denotes an angular coverage region, and $A_k$ denotes a binary random variable which is one if the second device transmits the ACK at the end of time-slot k and zero otherwise.

13. A system for establishing communication links in a millimeter wave (mmWave) network, the system comprising:

a memory; and one or more processors in communication with the memory configured to:

determine an active communication link between a first device and a second device, wherein the first device transmits probing packets to the second device;

employ a beam search technique to locate narrow beams by triggering the first device to adjust its transmission pattern to cover a fraction of an angular uncertainty region (AUR) at a beginning of a time-slot; and adjust transmission coefficients of the first device based on a response received from the second device;

wherein the second device sends an acknowledgment (ACK) packet to the first device and the first device updates the AUR such that the AUR is set to a probed angular interval when the second device receives a probing packet; and a negative-acknowledgment (NACK) is interpreted by the first device and the first device updates the AUR to a complementary part of the probed interval when the second device does not receive the probing packet.

* * * * *